(12) United States Patent
Ansari et al.

(10) Patent No.: US 7,807,262 B2
(45) Date of Patent: Oct. 5, 2010

(54) THERMAL INSULATIVE LABEL

(75) Inventors: Saifuddin M. Ansari, West Chester, OH (US); Robert J. Wojewoda, Amelia, OH (US); Kurt A. Zimmerman, Summerfield, NC (US)

(73) Assignee: Graphic Packaging International, Inc., Marietta, GA (US)

( * ) Notice: Subject to any disclaimer, the term of this patent is extended or adjusted under 35 U.S.C. 154(b) by 901 days.

(21) Appl. No.: 11/536,262

(22) Filed: Sep. 28, 2006

(65) Prior Publication Data

US 2008/0081185 A1    Apr. 3, 2008

(51) Int. Cl.
  *B32B 27/32*  (2006.01)
  *B32B 5/16*   (2006.01)
  *B32B 7/12*   (2006.01)
  *B32B 27/40*  (2006.01)
  *B32B 27/36*  (2006.01)
  *B32B 27/00*  (2006.01)

(52) U.S. Cl. ................ 428/323; 428/220; 428/327; 428/332; 428/343; 428/354; 428/423.1; 428/474.4; 428/480; 428/500

(58) Field of Classification Search .............. None
See application file for complete search history.

(56) References Cited

U.S. PATENT DOCUMENTS

| 3,401,475 | A  | * | 9/1968 | Morehouse et al. ........... 40/306 |
| 6,620,281 | B1 |   | 9/2003 | Sommers |
| 6,852,381 | B2 |   | 2/2005 | Debraal et al. |
| 6,887,541 | B2 |   | 5/2005 | Benim et al. |
| 7,070,841 | B2 |   | 7/2006 | Benim et al. |
| 2003/0003276 | A1 | * | 1/2003 | Mizuhara et al. ........... 428/195 |
| 2003/0124258 | A1 |   | 7/2003 | Benim et al. |

FOREIGN PATENT DOCUMENTS

WO    WO 95/08661    3/1995

OTHER PUBLICATIONS

International Search Report—PCT/US2007/079173.
Written Opinion—PCT/US2008/079173.

* cited by examiner

*Primary Examiner*—Sheeba Ahmed
(74) *Attorney, Agent, or Firm*—Womble Carlyle Sandridge & Rice, PLLC

(57) ABSTRACT

A thermally insulative label is provided. The label includes a first layer of material including an insulative coating, and a second layer of shrink material coupled to the first layer wherein the second layer includes graphics.

52 Claims, 3 Drawing Sheets

THERMAL INSULATIVE LABEL

BACKGROUND OF THE INVENTION

This invention relates generally to labels, and more specifically to insulative labels to be placed on containers.

At least some known labels include a layer of material such as cardboard that is wrapped around a container to provide insulation to the contents of the container. Such labels are generally not coupled to the container and are configured to slide over the exterior of the container. Furthermore, such labels may contain multiple layers of fibers or other similar materials. Additionally, such labels are typically awkward and bulky, making the labels difficult to use and manufacture. Additionally, many known labels routinely lack description.

BRIEF DESCRIPTION OF THE INVENTION

In one aspect, a thermally insulative label is provided. The label includes a first layer of material including an insulative coating, and a second layer of shrink material coupled to the first layer, wherein the second layer includes graphics.

In a further aspect, a thermal insulative label is provided. The label includes a layer of material including a first side and a second side, and an insulative coating applied to the second side of the layer of material prior to coupling the layer of material to a container such that the second side is adjacent the container.

In a further aspect, a thermal insulative label is provided. The label includes a first layer of material including graphics, and an insulative coating applied to a second layer of material wherein the second layer of material is coupled to the first layer of material prior to coupling the first and second layer of materials to a container.

In a further aspect, a thermal insulative label is provided. The label includes a first layer of shrink material including graphics, and a second layer of shrink material configured to couple to the first layer. The second layer includes an insulative coating including a laminating adhesive between the first layer and the second layer.

In a further aspect, a method of making a label is provided. The method includes providing at least one layer of material, applying an insulative coating to the at least one layer of material, and heating the at least one layer of material such that the insulative coating changes properties and becomes an insulative coating.

DETAILED DESCRIPTION OF THE INVENTION

The present invention provides a thermal insulative label, as well as a method of making the same. In one embodiment, the label includes an insulative coating to facilitate insulating a container.

The present invention is described below in reference to its application in connection with a container. In one embodiment, a label is constructed from at least one layer of material with an insulative coating. It will be apparent to those skilled in the art and guided by the teachings herein provided that the invention is applicable to any suitable container including, without limitation, a carton, a tray, a box, a bottle, a can, and a jar.

In a particular embodiment, the label includes at least one marking thereon including, without limitation, indicia that communicates the product, a manufacturer of the product and/or a seller of the product. For example, the marking may include printed text that indicates a product's name and briefly describes the product, logos and/or trademarks that indicate a manufacturer and/or seller of the product, and/or designs and/or ornamentation that attract attention. The label may have any suitable size, shape and/or configuration, i.e., any suitable number of layers having any suitable size, shape and/or configuration as described and/or illustrated herein.

Figure 1:
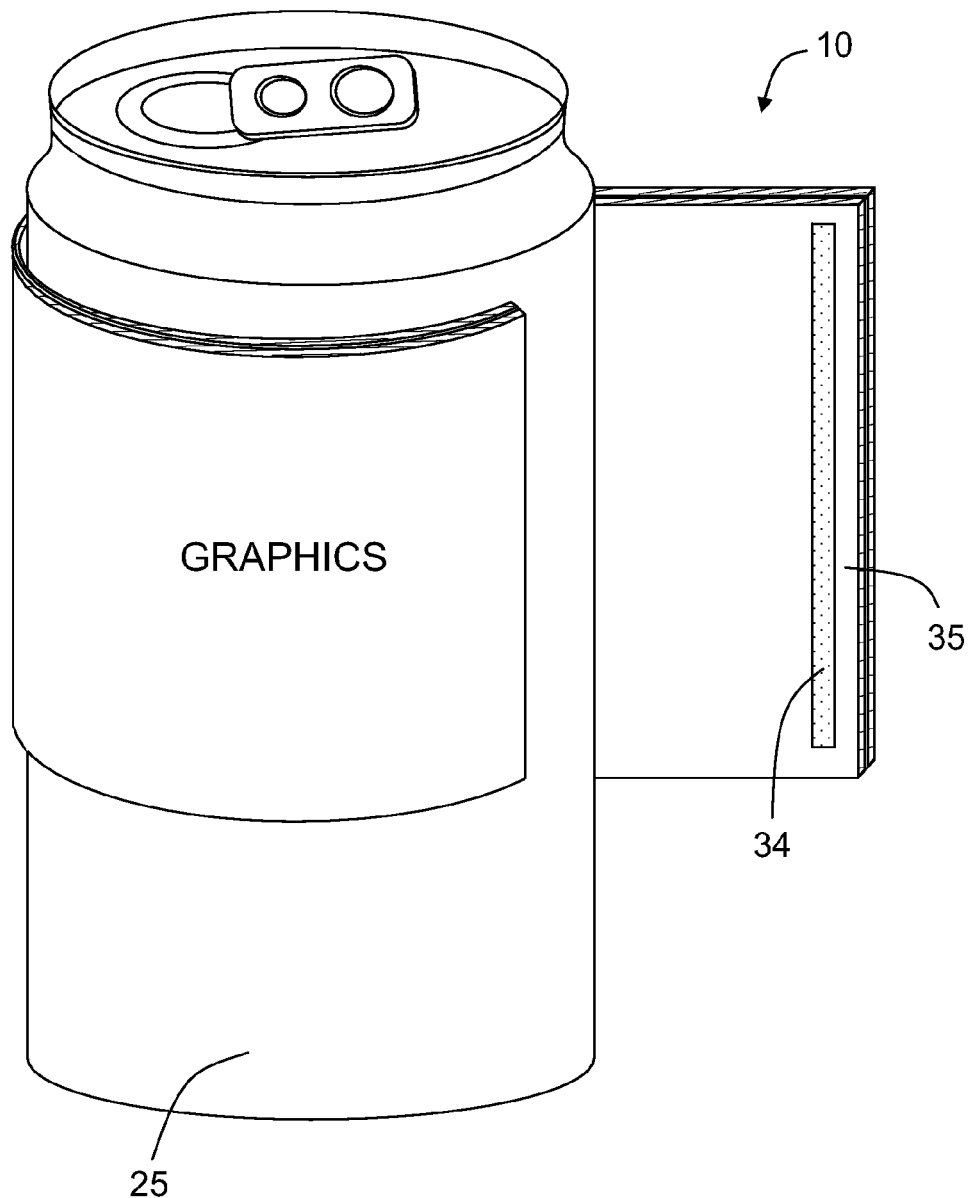
FIG. 1 is a perspective view of an exemplary embodiment of a container and an insulative label.

In accordance with the present invention, an insulating label stock is provided. The label stock is cut into individual lengths to make labels 10, 100, and 200. A thermal insulating coating 20 having a thermal resistance is applied to the label stock. As shown in FIG. 1, label 10 is configured to couple to a container to provide thermal insulation to the container.

Coating 20 is fabricated from, but not limited to, the following ingredients: at least one polymer, a plurality of expandable particles, water, and/or a solvent. In the exemplary embodiment, the polymer is a binder, and the expandable particles are microspheres. Exemplary polymers include, but are not limited to, vinyl acetate, acrylics, poly urethane, vinyl alcohol, poly amides, and epoxy. Exemplary solvents include, but are not limited to, alcohol and acetate. Alternatively, coating 20 includes various other suitable ingredients. In the exemplary embodiment, coating 20 includes a ratio of about 1:1 to 1:2 of expandable particles to polymer. Increasing the proportion of polymers in coating 20 increases the insulative effect of coating 20. The expandable particles and/or polymers in coating 20 expand and/or foam when heated to cure coating 20 and activate the insulating properties of coating 20. In the exemplary embodiment, as the coating is heated, solvent originally contained in the particles escapes and causes the particles to expand. Coating 20 thus formed, has insulative properties that can be used to keep cold beverages cold for longer periods of time and to keep hot beverages hot for longer periods of time. In addition, coating 20 facilitates handling containers that have hot or cold beverages therein, since it reduces the transmission of heat and cold through the label. Accordingly, it enables a consumer of the beverage to hold the container more comfortably. Another property of coating 20 is that it can serve as an adhesive that can be used to adhere a label to a container.

Figure 2:
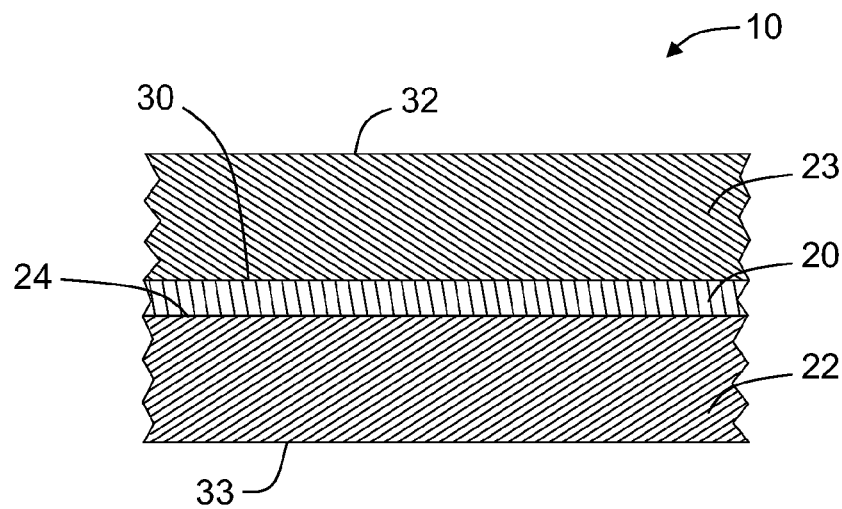
FIG. 2 is a cross-sectional view of an insulative label shown in FIG. 1.

As shown in FIG. 2, label 10 includes a first layer 22 of material and a second layer 23 of material. First layer 22 of label stock is provided with coating 20. In the exemplary embodiment, first layer 22 is a non-shrink film. Coating 20 of first layer 22 is either foamed or unfoamed. Additionally, in the exemplary embodiment, second layer 23 is a shrink film that is configured to couple to coating 20 on first layer 22. Second layer 23 may include graphics and/or indicia.

In the exemplary embodiment, first layer 22 is fabricated from a polymeric film. The polymeric film is a clear plastic flexible film fabricated from, but not limited to, polyethylene, polypropylene, and polyester. In the exemplary embodiment, the polyester is 48 gauge. Alternatively, first layer 22 is fabricated from, but not limited to, a fabric, a paper based material, and/or a foil based material and/or another suitable material known to those skilled in the art and guided by the teachings herein provided. In one embodiment, the paper based material has a 40-80 pound basis weight. A foil based material includes at least one of metalized oriented polypropylene (OPP), metalized oriented polystyrene (OPS), metalized polyvinyl chloride (PVC), and metalized polyethylene terephthalate (PET).

In the exemplary embodiment, second layer 23 is shrink material. The shrink material is one of PVC, glycol modified PET, polylactic acid (PLA) and/or OPS.

During fabrication of label 10, in the exemplary embodiment, first layer 22 is coupled to second layer 23 forming label 10 wherein label 10 is then coupled to a container 25 to facilitate insulating container 25.

More specifically, coating 20 is applied to a first side 24 of first layer 22. In the exemplary embodiment, coating 20 is sprayed onto a surface of first layer 22. Alternatively, coating 20 is applied to first layer 22 by other processes such as, but not limited to, rolling coating 20 onto first layer 22, painting coating 20 onto first layer 22, dipping first layer 22 in coating 20, gravure, flexure, and/or rod. In one embodiment, coating 20 is generally applied to the entire surface of first layer 22. However, in other embodiments, coating 20 is not applied to the entire surface of first layer 22. Coating 20 may be sprayed onto first layer 22 more than once to increase the thickness of coating 20 on first layer 22. Typically, the coating has a thickness between about 0.5 mils and 3.0 mils.

If coating 20 is unfoamed (i.e. uncured), first layer 22 of non-shrink film is foamed (i.e. cured) by passing first layer 22 through a hot air oven that is heated to a range of 120-150 degrees Celsius for approximately five to thirty seconds. In one embodiment, the coating is heated for about ten seconds. In addition, infrared heat can be used. As well, heat can be applied directly to the surface as through a heat gun. In the exemplary embodiment, coating 20 is cured before label 10 is applied to container 25. Alternatively, coating 20 is cured after label 10 is applied to container 25. Curing coating 20 activates insulative properties of coating 20 such that coating 20 lessens the temperature increase of the contents of container 25 over known containers. As well, coating 20 can serve as a laminating adhesive for the label.

In the exemplary embodiment, graphics are applied to a first side 30 of second layer 23 by reverse printing. Reverse printing the graphics on second layer 23 allows a consumer to view the graphics of label 10 from a second side 32 of second layer 23. Alternatively, graphics are not reverse printed on first side 30 but rather printed on first side 30. In addition, or in the alternative, graphics may be printed on second side 32.

Once coating 20 is cured on first layer 22 and graphics are applied to second layer 23, first side 30 is coupled to coating 20 forming label 10. More specifically, in the exemplary embodiment, second layer 23 is rolled onto first layer 22, cut to a desired size and shape, glued to first layer 22 securing its position, and then shrunk over first layer 22. Alternatively, second layer 23 is formed into a tube shape, slid over first layer 22, and shrunk over first layer 22. In the exemplary embodiment, first layer 22 and second layer 23 are not laminated together. Alternatively, first layer 22 and second layer 23 may be laminated together. In the exemplary embodiment, once first layer 22 and second layer 23 are coupled together forming label 10, label 10 is coupled to container 25. Specifically, a second side 33 of first layer 22 is coupled to container 25.

Generally, label 10 is adhesively coupled to itself around container 25 such that label 10 includes an adhesive strip 34 (shown in FIG. 1) along at least one edge 35 (shown in FIG. 1) of label 10.

Figure 3:
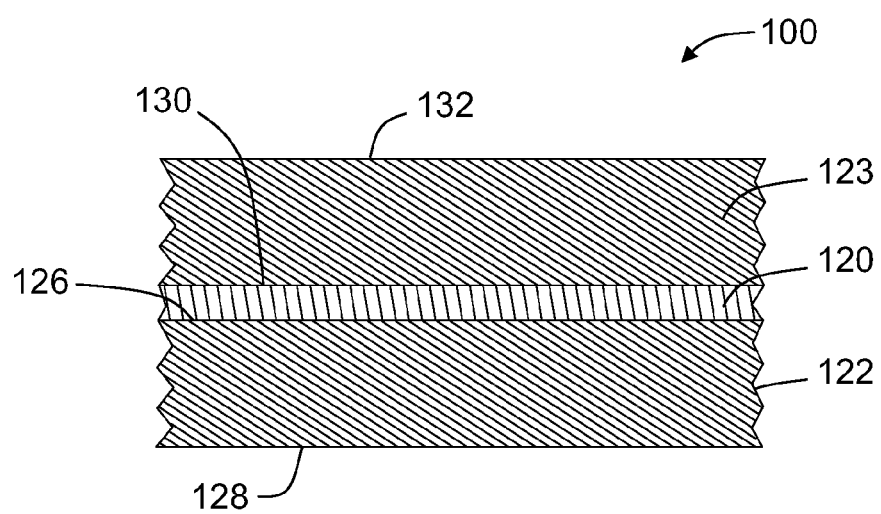
FIG. 3 is a cross-sectional view of an alternative embodiment of an insulative label shown in FIG. 1.

As shown in FIG. 3, label 100 is an alternative embodiment to label 10. Label 100 is similar to label 10 and like components are identified with like reference numerals. In this embodiment, label 100 is coupled to container 25 and includes a first layer 122 and a second layer 123. A coating 120, similar to coating 20, is positioned between first layer 122 and second layer 123 such that coating 120 acts as a laminating adhesive. First layer 122 and second layer 123 are similar to second layer 23 described above. First layer 122 includes a first side 126 and a second side 128, and second layer 123 includes a first side 130 and a second side 132. First layer 122 and second layer 123 are each fabricated of shrink material. In the exemplary embodiment, the shrink material is one of PVC, PETG, PLA and/or OPS. Additionally, in the exemplary embodiment, second layer 123 includes graphics and/or indicia.

During assembly of label 100, first side 126 of first layer 122 is sprayed with coating 120. As described above, coating 120 may be applied to first layer 122 utilizing other suitable methods. In addition, coating 120 can serve as a laminating adhesive. Graphics are printed onto first side 130 of second layer 123. Alternatively, graphics are applied to second side 132 of second layer 123. Furthermore, as described above, graphics may be applied to second layer 123 using other suitable methods.

Generally, first layer 122 and second layer 123 are coupled together wherein coating 120 is positioned between first layer 122 and second layer 123. More specifically, in the exemplary embodiment, first layer 122 is cut from the label stock and formed into a tube shape. Second layer 123 is then cut from the label stock to a desired size and shape, formed into a tube shape, and slid over first layer 122. Both first layer 122 and second layer 123 are slid over container 25 and are simultaneously shrunk around container 25. To shrink first layer 122 and second layer 123 around container 25, first layer 122 and second layer 123 are heated simultaneously at a temperature range of 100 to 300 degrees Fahrenheit to shrink first layer 122 and second layer 123 tightly around container 25. While first layer 122 and second layer 123 are simultaneously shrunk around container 25, coating 120 foams (i.e. cures), thus activating insulative properties of coating 120. In this embodiment, coating 120 acts as a laminating adhesive between first layer 122 and second layer 123. Alternatively, first layer 122 is coupled to second layer 123 using other suitable methods.

Figure 4:
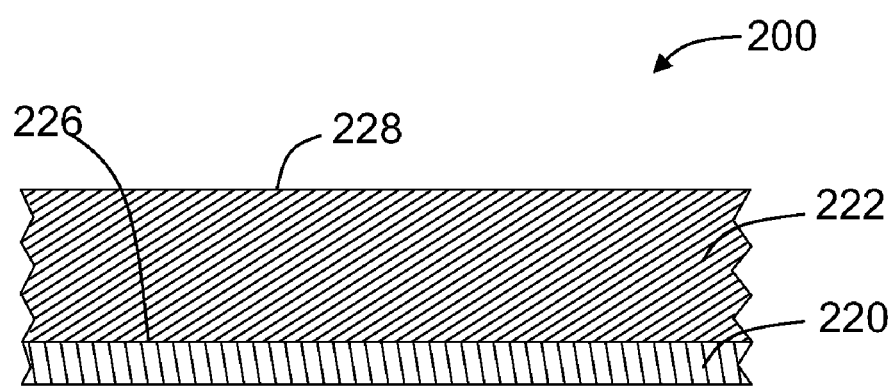
FIG. 4 is a cross-sectional view of an alternative embodiment of an insulative label shown in FIG. 1.

As shown in FIG. 4, label 200 is an alternative embodiment to label 10. Label 200 is similar to label 10 and like components are identified with like reference numerals.

In this embodiment, label 200 is coupled to container 25 and includes a single layer 222 wherein layer 222 is similar to first layer 22 described above. A coating 220, similar to coating 20, is applied to layer 222. Layer 222 includes a first side 226 and a second side 228.

The method of assembling label 200 includes spraying first side 226 of layer 222 with coating 220. As described above, coating 220 may be applied to layer 222 utilizing other suitable methods. Once coating 220 is applied to first side 226, graphics are printed onto layer 222. More specifically, in this embodiment, graphics are printed onto second side 228. Alternatively, graphics are printed onto first side 226 over coating 220. As described above, coating 220 may be applied to layer 222 using various suitable methods. Once coating 220 and graphics are applied to layer 222, layer 222 is coupled to container 25 using suitable coupling methods. Specifically, in this embodiment, coating 220 on first side 226 abuts a surface of container 25.

Activating the insulative properties of coating 220 for label 200 is similar to activating the insulative properties of coating 20 for label 10. In the exemplary embodiment, coating 220 is heated at a range of 120-150 degrees Celsius for approximately ten seconds prior to coupling layer 222 to container 25. Alternatively, coating 220 is heated after coupling layer 222 to container 25.

While the invention has been described in terms of various specific embodiments, those skilled in the art will recognize that the invention can be practiced with modification within the spirit and scope of the claims.

What is claimed is:

1. A thermally insulative label for a container, the label comprising:
   a layer of insulative material including a plurality of expanded particles and a polymer binder;
   a layer of shrink material adjacent to the layer of insulative material, the shrink material comprising a polymer film operative for shrinking, and thereby, joining the label to the container; and
   at least one marking disposed on the layer of shrink material, wherein the polymer binder is selected from the group consisting of vinyl acetate, acrylics, poly urethane, vinyl alcohol, poly amides, and epoxy.

2. The label of claim 1, wherein the expanded particles comprise expanded microspheres.

3. The label of claim 1, wherein the layer of insulative material comprises the expanded particles and the polymer binder in a ratio of from about 1:1 to 1:2.

4. The label of claim 1, wherein the layer of shrink material comprises a polymer selected from the group consisting of polyvinyl chloride, glycol modified polyethylene terephthalate, polylactic acid, and oriented polystyrene.

5. The label of claim 1, wherein the marking is disposed on a side of the layer of shrink material adjacent to the layer of insulative material.

6. The label of claim 1, wherein the marking is disposed on a side of the layer of shrink material opposite the layer of insulative material.

7. The label of claim 1, coupled to a container such that the layer of insulative material is disposed between the container and the layer of shrink material.

8. A thermally insulative label for a container, the label comprising:
   a layer of insulative material including a plurality of expanded particles and a polymer binder;
   a first layer of shrink material adjacent to the layer of insulative material, the first layer of shrink material comprising a polymer film operative for shrinking, and thereby, joining the label to the container;
   at least one marking disposed on the layer of shrink material; and
   a second layer of shrink material on a side of the layer of insulative material opposite the first layer of shrink material, such that the layer of insulative material is disposed between the first layer of shrink material and the second layer of shrink material.

9. The label of claim 8, wherein the layer of insulative material is in a contacting relationship with the first layer of shrink material and the second layer of shrink material, such that the layer of insulative material serves to couple the first layer of shrink material and the second layer of shrink material.

10. A thermally insulative label for a container, the label comprising:
    a layer of insulative material including a plurality of expanded particles and a polymer binder;
    a layer of shrink material adjacent to the layer of insulative material, the shrink material comprising a polymer film operative for shrinking, and thereby, joining the label to the container;
    at least one marking disposed on the layer of shrink material; and
    a layer of nonshrink material on a side of the layer of insulative material opposite the layer of shrink material, such that the layer of insulative material is disposed between the layer of nonshrink material and the layer of shrink material.

11. The label of claim 10, wherein the layer of insulative material is in a contacting relationship with the layer of nonshrink material and the layer of shrink material, such that the layer of insulative material serves to couple the layer of nonshrink material and the layer of shrink material.

12. The label of claim 10, wherein the layer of nonshrink material comprises at least one of a polymer film, a fabric, a paper based material, and a foil based material.

13. The label of claim 10, wherein the layer of nonshrink material comprises polyethylene, polypropylene, or polyester.

14. The label of claim 10, wherein the layer of nonshrink material comprises metallized oriented polypropylene, metallized oriented polystyrene, metallized polyvinyl chloride, or metallized polyethylene terephthalate.

15. A thermally insulative label for a container, the label comprising:
    a layer of insulative material;
    a layer of shrink material adjacent to the insulative material, the shrink material being operative for shrinking, and thereby, joining the label to the container, the layer of shrink material comprising a polymer film selected from the group consisting of polyvinyl chloride, glycol modified polyethylene terephthalate, polylactic acid, and oriented polystyrene; and
    at least one marking disposed on the layer of shrink material.

16. The label of claim 15, wherein the layer of insulative material comprises a polymer foam.

17. The label of claim 15, wherein the layer of insulative material comprises a plurality of expanded particles.

18. The label of claim 17, wherein the layer of insulative material further comprises a binder.

19. The label of claim 18, wherein the layer of insulative material comprises the expanded particles and the binder in a ratio of from about 1:1 to 1:2.

20. The label of claim 15, wherein the marking is disposed on a side of the layer of shrink material adjacent to the layer of insulative material.

21. The label of claim 15, wherein the marking is disposed on a side of the layer of shrink material opposite the layer of insulative material.

22. The label of claim 15, wherein
    the layer of shrink material is a first layer of shrink material, and
    the label further comprises a second layer of shrink material on a side of the layer of insulative material opposite the first layer of shrink material, such that the layer of insulative material is disposed between the first layer of shrink material and the second layer of shrink material.

23. The label of claim 22, wherein the layer of insulative material is in a contacting relationship with the first layer of shrink material and the second layer of shrink material, such that the layer of insulative material serves to couple the first layer of shrink material to the second layer of shrink material.

24. The label of claim 15, further comprising a layer of nonshrink material on a side of the layer of insulative material opposite the layer of shrink material, such that the layer of insulative material is disposed between the layer of nonshrink material and the layer of shrink material.

25. The label of claim 24, wherein the layer of insulative material is in a contacting relationship with the layer of nonshrink material and the layer of shrink material, such that the layer of insulative material serves to couple the layer of nonshrink material to the layer of shrink material.

26. The label of claim 24, wherein the layer of nonshrink material comprises at least one of a polymer film, a fabric, a paper based material, and a foil based material.

27. The label of claim 24, wherein the layer of nonshrink material comprises polyethylene, polypropylene, or polyester.

28. The label of claim 24, wherein the layer of nonshrink material comprises metallized oriented polypropylene, metallized oriented polystyrene, metallized polyvinyl chloride, or metallized polyethylene terephthalate.

29. A thermally insulative label for a container, the label comprising:
   a layer of insulative material comprising a plurality of expanded particles and a polymer binder, the polymer binder being selected from the group consisting of vinyl acetate, acrylics, polyurethane, vinyl alcohol, polyamides, and epoxy; and
   a shrinkable polymer film operative for shrinking, and thereby, joining the label to the container, the polymer film being selected from the group consisting of polyvinyl chloride, glycol modified polyethylene terephthalate, polylactic acid, and oriented polystyrene.

30. The label of claim 29, further comprising a marking disposed on the shrinkable polymer film.

31. The label of claim 29, wherein the layer of insulative material has a thickness of from about 0.5 to about 3.0 mils.

32. The label of claim 29, wherein
   the shrinkable polymer film is a first shrinkable polymer film, and
   the label further comprises a second shrinkable polymer film on a side of the layer of insulative material opposite the first shrinkable polymer film, such that the layer of insulative material is disposed between the first shrinkable polymer film and the second shrinkable polymer film.

33. The label of claim 29, further comprising a layer of nonshrink material on a side of the layer of insulative material opposite the shrinkable polymer film, such that the layer of insulative material is disposed between the layer of nonshrink material and the shrinkable polymer film.

34. The label of claim 33, wherein the layer of nonshrink material comprises at least one of a polymer film, a fabric, a paper based material, and a foil based material.

35. The label of claim 34, wherein the layer of nonshrink material comprises polyethylene, polypropylene, or polyester.

36. The label of claim 34, wherein the layer of nonshrink material comprises metallized oriented polypropylene, metallized oriented polystyrene, metallized polyvinyl chloride, or metallized polyethylene terephthalate.

37. A thermally insulative label for a container, the label comprising:
   a layer of insulative material comprising a plurality of expanded particles and a polymer binder; and
   a shrinkable polymer film, the polymer film being operative for joining the label to the container without the use of an adhesive, the polymer film being selected from the group consisting of polyvinyl chloride, glycol modified polyethylene terephthalate, polylactic acid, and oriented polystyrene.

38. The label of claim 37, wherein the layer of insulative material comprises a polymer foam.

39. The label of claim 37, wherein the layer of insulative material comprises a plurality of expanded particles.

40. The label of claim 37, further comprising a marking disposed on the shrinkable polymer film.

41. The label of claim 37, wherein
   the shrinkable polymer film is a first shrinkable polymer film, and
   the label further comprises a second shrinkable polymer film on a side of the layer of insulative material opposite the first shrinkable polymer film, such that the layer of insulative material is disposed between the first shrinkable polymer film and the second shrinkable polymer film.

42. The label of claim 37, further comprising a layer of nonshrink material on a side of the layer of insulative material opposite the shrinkable polymer film, such that the layer of insulative material is disposed between the layer of nonshrink material and the shrinkable polymer film.

43. The label of claim 42, wherein the layer of nonshrink material comprises at least one of a polymer film, a fabric, a paper based material, and a foil based material.

44. The label of claim 42, wherein the layer of nonshrink material comprises polyethylene, polypropylene, or polyester.

45. The label of claim 42, wherein the layer of nonshrink material comprises metallized oriented polypropylene, metallized oriented polystyrene, metallized polyvinyl chloride, or metallized polyethylene terephthalate.

46. A thermally insulative label for a container, the label consisting essentially of:
   a first shrinkable polymer film;
   a second shrinkable polymer film, at least one of the first shrinkable polymer film and second shrinkable polymer film being operative for joining the label to the container; and
   a layer of insulative material disposed between the first shrinkable polymer film and the second shrinkable polymer film, the insulative material comprising a plurality of expanded particles and a polymer binder.

47. The label of claim 46, wherein the first shrinkable polymer film and the second shrinkable polymer film are each independently selected from the group consisting of polyvinyl chloride, glycol modified polyethylene terephthalate, polylactic acid, and oriented polystyrene.

48. The label of claim 46, wherein the polymer binder is selected from the group consisting of vinyl acetate, acrylics, polyurethane, vinyl alcohol, polyamides, and epoxy.

49. The label of claim 46, further comprising a marking disposed on at least one of the first shrinkable polymer film and the second shrinkable polymer film.

50. The label of claim 46, wherein the layer of insulative material has a thickness of from about 0.5 to about 3.0 mils.

51. A thermally insulative label for a container, the label consisting essentially of:
   a polymer film including at least one marking; and
   a layer of insulative material supported on the polymer film, the layer of insulative material being operative for joining the label to the container, the layer of insulative material including
      a plurality of expanded particles, and
      a polymer binder selected from the group consisting of vinyl acetate, acrylics, polyurethane, vinyl alcohol, polyamides, and epoxy.

52. The label of claim 51, wherein the layer of insulative material comprises the expanded particles and the binder in a ratio of from about 1:1 to 1:2.

* * * * *